United States Patent [11] 3,537,571

[72] Inventor Hans-Holger Wiese
 3001 Fuhrberg No. 197, Fuhrbert,
 Germany
[21] Appl. No. 768,278
[22] Filed Oct. 17, 1968
[45] Patented Nov. 3, 1970

[54] TOOTHED CONVEYOR BELT
 11 Claims, 9 Drawing Figs.
[52] U.S. Cl. .................................................... 198/193
[51] Int. Cl. ................................................. B65g 15/30
[50] Field of Search ........................................... 198/177,
 184, 193

[56] References Cited
 UNITED STATES PATENTS
 3,485,707 12/1969 Spicer .......................... 198/193X Primary Examiner—Edward A. Sroka
Attorney—Richards & Geier ABSTRACT: An endless conveyor belt has a reinforcement, on both sides of which regularly spaced transverse tooth blocks with transverse holds are arranged. Into these holes rods are inserted the ends of which are joined with one another and with a supporting member of the conveyor element by connecting members arranged on both sides of the belt parallel to one another.

INVENTOR
Hans-Holger Wiese

Richards & Geier
ATTORNEYS

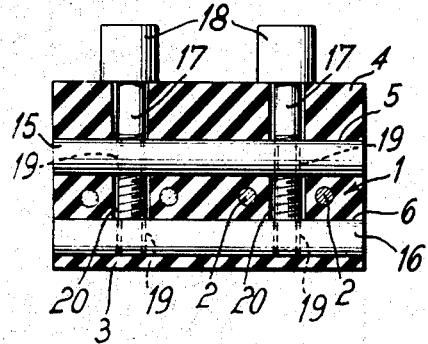
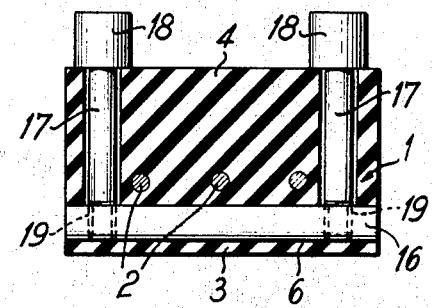
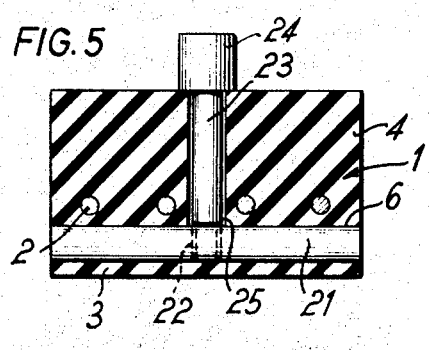
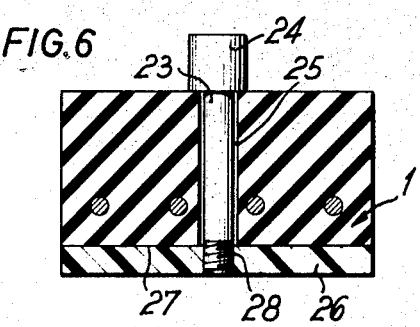
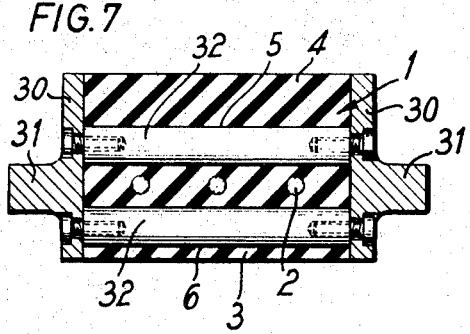
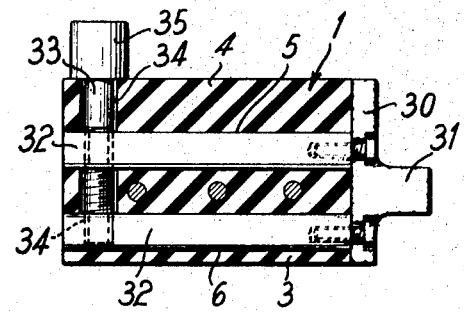
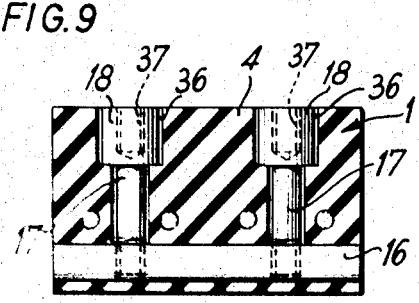
INVENTOR
Hans-Holger WIESE

TOOTHED CONVEYOR BELT

DESCRIPTION

This invention relates to a toothed conveyor belt with regularly spaced transverse tooth blocks of an elastic material which are provided with transverse recesses near a reinforcement of the belt.

In the conventional constructions of bar grate conveyor belts, the conveyor units bear against transverse rods which are interposed between two parallel toothed belts and have forked ends by which they are inserted into recesses of the tooth blocks of the belts by which the transverse rods are carried. The forks of the transverse rods are symmetrical with respect to the reinforcement of the belt. When the conveyor belts in these constructions are subjected to heavy charges, for instance by high rotation speeds and/or by heavy loads, the centrifugal forces or the stress of the conveyor units exerted on the transverse rods may lead to deformation of the transverse rods. This is the case particularly if there is a lever arm of some length between the point of engagement of the conveyor units to the transverse rods and the reinforcements of the toothed belt at the end of the rods. The lever arm causes the transverse rods to be subjected to large bending moments while passing deflection points of the belt assembly or on account of the weights carried by the conveyor units. The bending stresses can permanently deform the rods when heavy charges are exerted.

It is an object of the present invention to provide a toothed conveyor belt of the the above described type in which the attachment of the conveyor units to the belt is made in such a manner that large centrifugal forces and/or weight charges can be absorbed without any risk of permanent deformation of the transverse rods.

To this end, connecting pieces for the carrying rods for the conveyor units are arranged vertically of the supporting members inserted into the transverse grooves of the toothed belt and bear against these. In this manner, the centrifugal forces of the single conveyor units are via their carrying rods and the connecting pieces bearing against them indirectly transmitted into the reinforcement of the toothed belt, allowing for only short lever arms between the reinforcement and the deflection points of the belt assembly. It is therefore possible that the toothed belt resists relatively large forces in spite of small outlay in material.

The transverse grooves of the toothed belt are preferably provided in pairs on the upper and lower sides of its reinforcement. Inserted into each transverse groove is a rod-shaped supporting member. The pair of supporting members is by a pair of the above-mentioned connecting pieces in communication with the carrying rod for the conveyor unit.

The respective ends of the two supporting members project out of the grooves and are connected with each other by the above-mentioned connecting pieces, which extend parallel of each other and are clip-shaped. The connecting pieces extend upwards beyond the top of the tooth block of the belt and in this upper portion are kept together by the carrying rod for the conveyor unit. The connecting pieces may be sunk into lateral excavations of the toothed belt the depth of which is such that the clip-shaped connecting pieces and the ends of the rod-shaped supporting members do not protrude over the lateral surfaces of the tooth blocks of the belt. In this manner it is assured that the movement of the belt over the chain wheels produces only relatively little noise.

In a modified embodiment, the connecting pieces for the carrying rods are placed within the toothed belt in between its reinforcement and are in form-locking gear, for instance by a screwing, with the supporting members. The supporting member may be plate-shaped and may be mounted at the lower side of a tooth block. It should be provided with a threaded bore for the bolt-shaped connecting piece. In order that the supporting member may be used as a slide shoe in case the belt is guided over a table plate it is advantageous to provide it exchangeably at the bottom of the tooth block, preferably covering the whole of its bottom surface, and to manufacture it of a material with good running features.

Other objects and advantages of the invention will be explained in the following detailed description in which reference is made to the accompanying drawings showing, in a simplified manner, a variety of embodiments of the toothed conveyor belt according to the invention. In the drawings:

FIG. 3 is a cross section of a modified embodiment with two connecting pieces arranged within the toothed conveyor belt in between its reinforcement;

FIG. 4 is a variation of FIG 3;

FIG. 5 is a cross section of another embodiment with a connecting piece imbedded in the toothed belt;

FIG. 6 is a variation of FIG. 5;

FIG. 7 is a cross section of another modification with two connecting pieces sunk into the toothed belt at both its lateral surfaces;

FIG. 8 is a variation of FIG. 7;

FIG. 9 is a cross section of yet another modified embodiment with connecting pieces completely imbedded in the toothed belt.

Figure 1:
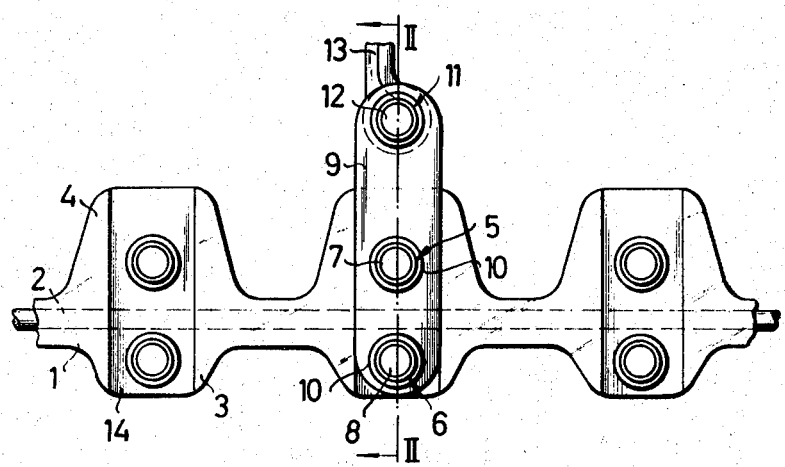
FIG. 1 is a lateral view of an embodiment of a toothed conveyor belt according to the invention with lateral clip-like connecting pieces.
Figure 2:
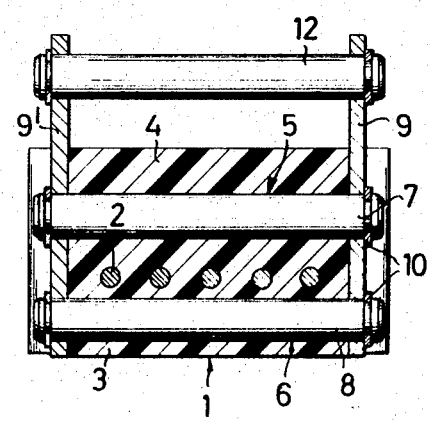
FIG. 2 is a section taken along line II-II of FIG. 1.

In the embodiment of FIGS. 1 and 2, a toothed belt 1, which consists of an elastic material such as rubber, is provided with a tension-proof reinforcement 2 which is composed of a plurality of parallel steel wires and extends in the neutral zone of the upper tooth blocks 4 and lower tooth blocks 3. Near the upper and lower sides of reinforcement 2 cylindrical transverse grooves 5 and 6 are provided which accommodate rod-shaped supporting members 7 and 8 respectively. The ends of the supporting members 7 and 8 project at both sides out of the tooth blocks 3 and 4 and are joined with each other by clip-shaped side bars or connecting members 9 and 9' which upwardly extend beyond the upper surface of tooth block 4 and have respective bore holes 11, guided in which is a rod-shaped carrying member 12 for the conveyor unit, for instance a container, which is not shown in any of the FIGS. of the drawings, and is adapted to be suspended to member 12 by a hook 13 shown in FIG. 1. The carrying member 12 is therefore located above, or, depending on the position of the toothed belt, sometimes below the tooth block 4 Or 3. The conveyor unit to be suspended to the belt assembly may, alternatively, be attached directly to the side bars 9, 9'. Sunk into the lateral surface of tooth blocks 3 and 4 are recesses 14 of such depth that the side bars 9 and 9' and the ends of the bar-shaped supporting members 7 and 8 as well as carrying member 12 do not project over the lateral surface of the toothed belt. Thus the recesses 14 are formed in the lateral surfaces of the tooth blocks 3 and 4 and received the plates 9 and 9'.

By the forces emanating from the conveyor unit the rod-shaped carrying member 12 is mainly exposed to shearing impacts, and the side bars 9 and 9' are under tensile stress. From the side bars 9 and 9' the forces are transmitted to the wires of reinforcement 2 via the rod-shaped supporting member 7 or 8, depending on the direction of deflection or position of the belt. There are, therefore, no large bending moments in this area.

As the side bars 9 and 9' are imbedded in the respective recesses 14 of the lateral surface of tooth blocks 3 and 4 the toothed belt is given lateral support mainly at the remaining lateral surfaces of tooth blocks 3 and 4 by the sprocket wheels which serve as guide or drive wheels. This causes a rotation of the belt on the sprocket wheels of low noise level and of little wearability.

In the embodiment of FIG. 3, rods 15 and 16 are mounted within the transverse grooves 5 and 6 on the upper and lower sides of reinforcement 2 to be used as supporting members for two parallel bolt-shaped connecting pieces 17 and which extend at right angles of rods 15 and 16 and are at their lower ends provided with threads gearing with threaded bores 19 of the supporting rods 15 and 16. The upper ends 18 of the two connecting pieces 17, which extend beyond the upper surface of the tooth block 4 of belt 1, are used as carrying members for a conveyor unit not shown in the drawing. Parts 17 are arranged in vertical grooves 20 pervading the upper tooth block 4 in between the single wires of reinforcement 2.

In FIG. 4, the two bolt-shaped connecting pieces 17 are mounted outside the wires of reinforcement 2 of belt 1, and their threaded ends are screwed into the threaded bore 19 of the rod-shaped supporting member 16 which is inserted into the transverse groove 6 below reinforcement 2.

In the embodiment of FIG. 5, the toothed belt is in the same manner as in FIG. 4 provided with a single transverse groove 6 beneath reinforcement 2, inserted into which is a rod-shaped supporting member 21 having a threaded bore 22 which is arranged in the center axis of the toothed belt 1. Screwed into bore 22 is the lower threaded end of a bolt-shaped connecting piece 23, the upper end 24 of which projects beyond the upper surface of tooth block 4 and is adapted to be connected to a carrying member for the conveyor unit. The connecting piece 23 is accommodated in a grove 25 of tooth block 4, which extends downwards to reach the threaded bore 22.

The modified embodiment of FIG. 6 differs from the one of FIG. 5 in that the supporting member 21 of FIG. 5 is replaced by a plate 26 which is sunk into a transverse recess 27 at the lower surface of tooth block 3 and which in its center portion is provided with a threaded bore 28 into which the bolt-shaped connecting piece 23 is screwed. The plate 26 may be designed as a slide shoe and for this purpose may be made of an artificial material of good slide characteristics, such as polyamide. The plate 26 is preferably fastened to the recess 27 in such a manner that it may be easily detached from its seat when wear and tear necessitate its exchange. It is advantageous that the plate 26 covers the entire surface of block 3, which is a protection for the toothed belt, being of importance, for instance, in case it is guided over a table plate.

The toothed belt shown in FIG. 7 is at either side provided with a clip-shaped connecting piece 30 which is sunk into a recess of its lateral surface and has a projection 31 extending beyond this lateral surface. The projection 31 is used as the carrying member for the conveyor unit. The two opposite connecting pieces 30 are joined together by two bolt-shaped supporting members 32 which are inserted into the lateral grooves 5 and 6 at both sides of reinforcement 2.

In FIG. 8, the clip-shaped connecting piece 30 is attached only to one side of belt 1, whereas the portion of the belt near the opposite side is provided with a connecting piece 33 in the shape of a screw bolt which is screwed into a threaded bore 34 of the two supporting members 32 inserted into the transverse grooves 5 and 6. The bore 34 in which the connecting piece 33 is accommodated extends from the upper tooth block 4 to the transverse groove 6 underneath reinforcement 2. The carrying member for the conveyor unit is in this modification formed by the upper end 35 of connecting piece 33, which projects over the upper surface of tooth block 4.

FIG. 9 represents another modification in which the carrying members for the conveyor unit are formed by the respective ends 18 of the two bolt-shaped connecting pieces 17 similar to FIG. 3; these ends are fully sunk into two respective recesses 36 of the upper block 4 of belt 1 and have threaded bores 37 into which the conveyor unit may be screwed to be attached to the belt. The other parts of this embodiment are in accordance with FIG. 4.

Having thus described my invention, it is understood that the embodiments shown in the drawings and referred to in this specification are to be understood as examples only and other combinations of parts are fully within the scope of the invention and the appended claims.

I claim:

1. A toothed conveyor belt, comprising tooth blocks of an elastic material, a reinforcement imbedded into the material of the belt, transverse recesses in said blocks, supporting members inserted in said recesses and projecting over the lateral edge of the belt, a carrying element of a conveyor unit arranged outside said tooth block, and connecting members joining the ends of said supporting members with one another and with said carrying element of the conveyor unit, said connecting members are arranged parallel to one another on both sides of the toothed belt.

2. A toothed conveyor belt in accordance with claim 1 in which the transverse recesses are provided at either side of the reinforcement of the toothed belt and enclose two bar-shaped supporting members.

3. A toothed conveyor belt in accordance with claim 2 in which the supporting members are joined with each other and with the carrying element of a conveyor unit by means of clip-shaped connecting pieces.

4. A toothed conveyor belt in accordance with claim 3 in which the clip-shaped connecting pieces are laterally sunk into the toothed belt in such a manner that they do not project over the lateral surfaces of the tooth blocks.

5. A toothed conveyor belt according to claim 3 wherein the clip-shaped connecting pieces project over the upper surface of the upper tooth block of said toothed belt and are joined together in this area by a carrying member for the conveyor unit.

6. A toothed conveyor belt according to claim 3 wherein the clip-shaped connecting pieces are provided with lateral projections which are adapted to form carrying elements for the conveyor unit.

7. A toothed conveyor belt according to claim 2 wherein the connecting pieces are arranged between the reinforcement of the toothed belt and are in form-locking gear with the supporting members.

8. A toothed conveyor belt according to claim 2 wherein the supporting member is of plate-like shape and is arranged at the lower side of a tooth block of the belt.

9. A toothed conveyor belt according to claim 1 wherein the respective ends of the bolt-shaped connecting pieces which are adapted to form carrying elements for the conveyor are imbedded in a recess of the tooth block.

10. A toothed conveyor belt according to claim 8 in which the plate-shaped supporting member is constructed as a slide shoe.

11. A toothed conveyor belt according to claim 8 in which the supporting member is exchangeably arranged at the tooth block and covers its head surface.